United States Patent [19]

Pappas et al.

[11] Patent Number: 4,672,396
[45] Date of Patent: Jun. 9, 1987

[54] HARD COPY RECORDER PAPER SPEED CONTROL

[75] Inventors: Dean Pappas, Lodi, N.J.; Howard F. Fidel, Hartsdale, N.Y.

[73] Assignee: Johnson & Johnson Ultrasound Inc., Ramsey, N.J.

[21] Appl. No.: 838,076

[22] Filed: Mar. 10, 1986

[30] Foreign Application Priority Data

Mar. 25, 1985 [GB] United Kingdom ................. 8507652

[51] Int. Cl.$^4$ ...................... G01D 15/24; B65H 59/38; H02P 5/16
[52] U.S. Cl. .................. 346/136; 242/75.51; 242/186; 242/189; 242/190; 242/207; 318/6; 318/318; 346/107 R; 346/108; 346/110 R
[58] Field of Search ................... 346/136, 108, 110 R, 346/107 R; 242/75, 51, 186, 189, 190, 201, 207; 318/318, 6

[56] References Cited

U.S. PATENT DOCUMENTS

| | | | |
|---|---|---|---|
| 4,232,257 | 11/1980 | Harshberger, Jr. | 318/314 |
| 4,429,261 | 1/1984 | Ohno | 318/6 X |
| 4,442,985 | 4/1984 | Kishi et al. | 242/186 |

Primary Examiner—E. A. Goldberg
Assistant Examiner—Gerald E. Preston
Attorney, Agent, or Firm—W. Brinton Yorks, Jr.

[57] ABSTRACT

A hard copy recorder is provided in which paper or film is moved along a paper path by a motor-driven roller. A tension-measuring dancer measures paper or film tension. The position of the dancer is sensed by an optical sensor, which produces a signal representative of paper or film tension. The paper or film tension signal is used to selectively couple one signal from a number of sources of predetermined different frequencies to the motor to control its speed in accordance with the sensed paper tension.

11 Claims, 7 Drawing Figures

HARD COPY RECORDER PAPER SPEED CONTROL

This invention relates to hard copy recorders in which light-sensitive paper or film is exposed by a cathode ray tube image and then thermally developed, and particularly to apparatus for controlling the speed at which the paper or film moves through the recorder.

In a typical hard copy recorder light-sensitive paper or film is stored in a roll in the recorder. The paper or film is threaded through the recorder so that it will pass by the face of a cathode ray tube, through a paper cutter, around a heated platen, then fed out of the recorder to the user. The paper path through the recorder is generally quite lengthy, and the paper usually makes several turns as it passes through the machine. It is important for the paper to move at a uniform velocity and to be under relatively constant tension as it is pulled through the recorder by one or more powered metering rollers. If the paper speed or tension vary substantially, the paper can be stretched between the motor-driven rollers which are moving the paper at differing speeds. The motors can draw excess current, or the paper will slip as it is pulled non-uniformly through the recorder. The slipping paper will then no longer move uniformly down the center of the paper path, thereby producing images of poor quality. Alternatively, too little paper tension can result in buckling by the loose paper which will crumple, causing the paper feed mechanism to become jammed with folded paper.

In accordance with the principles of the present invention, a tension-measuring "dancer" is included in the paper path of a hard copy recorder. The dancer is in contact with the paper or film, and its position, which is determined by the paper or film tension, is sensed by an optical sensor. The position signal produced by the sensor is processed and used to adjust the speed of a powered roller which moves the paper or film through the recorder. In this way the paper or film will experience a relatively constant tension over a number of different paper or film speeds, and will not tear or crumple as it moves through the recorder.

Figure 1:
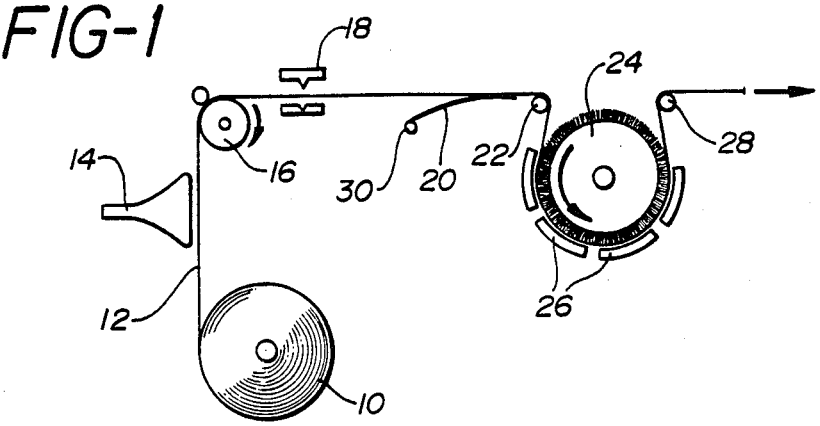
FIG. 1 is a schematic representation of the paper path of a hard copy recorder constructed in accordance with the principles of the present invention.
Figure 3:
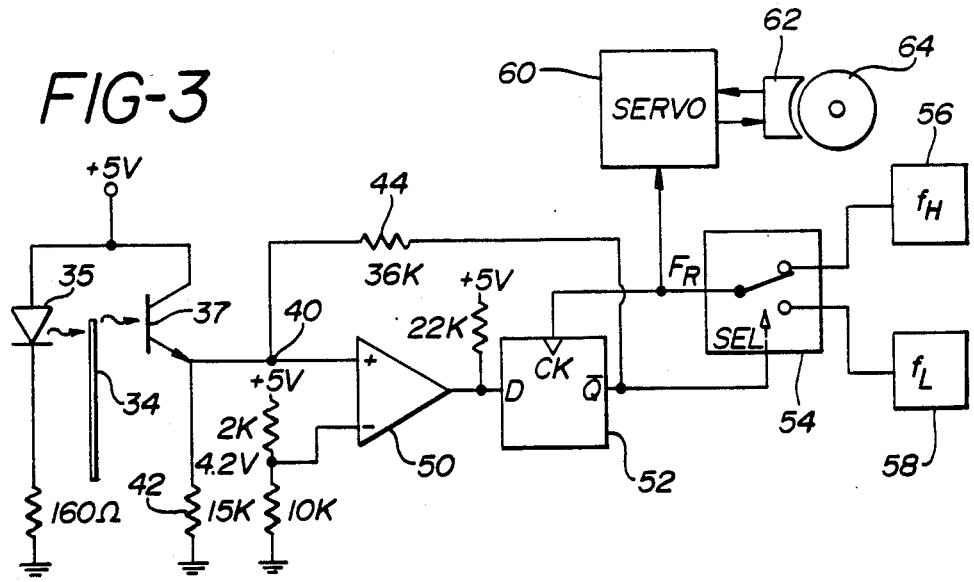
Figure 4:
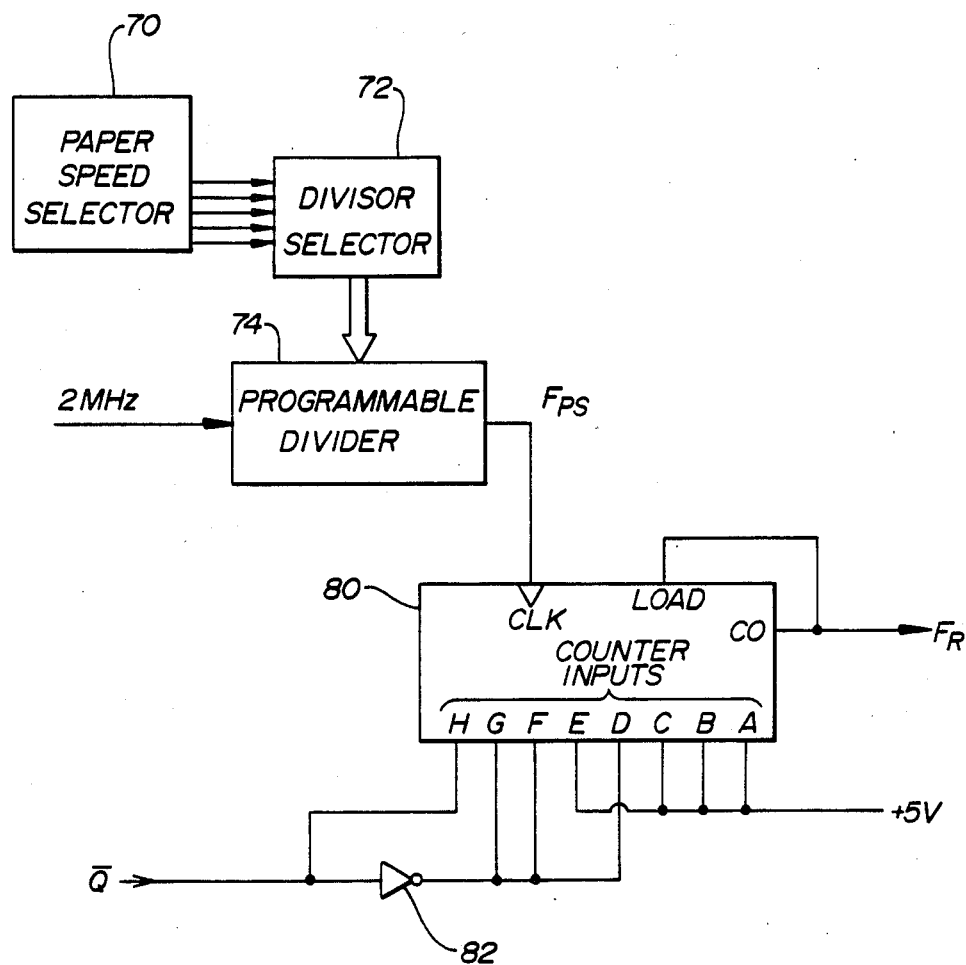
Figure 5A:
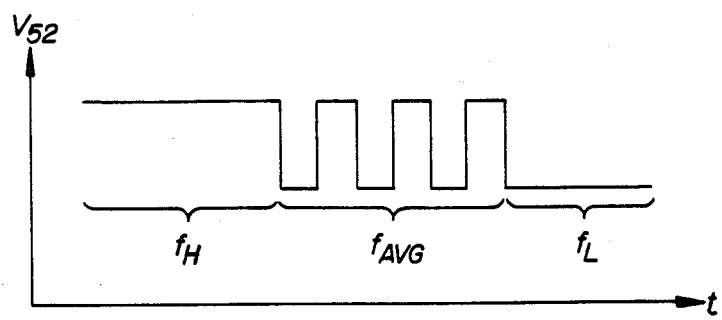
Figure 5B:
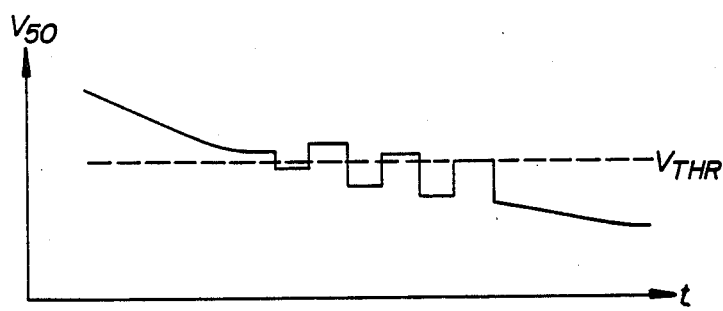

FIGS. 3 and 4 illustrate control circuitry responsive to the dancer position for controlling the speed of rotation of the developer drum shown in FIG. 1; and FIGS. 5a and 5b show waveforms illustrating the operation of the circuitry of FIGS. 3 and 4.

Referring first to FIG. 1, the paper path of a hard copy recorder constructed in accordance with the principles of the present invention is shown. Light-sensitive paper 12 unrolls from a roll 10 of paper. The paper passes in front of a cathode ray tube 14, where the paper is exposed, line by line, to an image. The paper is pulled past the cathode ray tube by a motor driven constant velocity metering roller 16. The paper then passes through a paper cutter 18 and over a tension measuring dancer 20 mounted on a shaft 30. The exposed paper wraps around another roller 22 and onto a developing drum 24. The developing drum 24 is covered with a soft covering of Nomex material, which pulls the paper past sections of a heated platen 26 for developing. The drum 24 with its Nomex covering appears much like a paint roller and the felt-like nap of the Nomex pulls the paper without scratching the exposed surface. The paper passes around a further roller 28 and is then presented to the user.

During use the Nomex nap of the developing drum can become compressed. The compression of the nap will reduce the effective circumference of the drum. Since the drum is motor driven so as to pull the paper past the platen, the change in the circumference of the drum will change the speed at which the paper moves. The paper will thus be pulled at different speeds by the metering roller 16 and the drum 24. This speed differential will change the tension of the paper between the roller 16 and the drum 24. In accordance with the principles of the present invention, the tension of the paper is monitored by the tension measuring dancer 20.

Figure 2A:
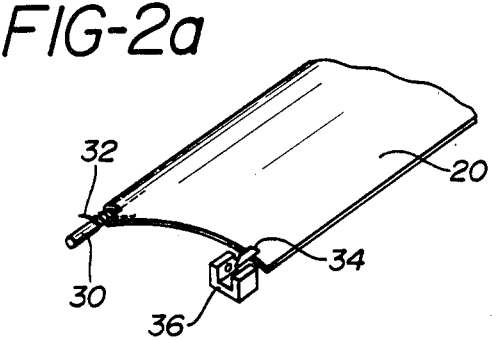
FIGS. 2a and 2b are an illustration of the dancer used in the paper path of the recorder of FIG. 1.
Figure 2B:
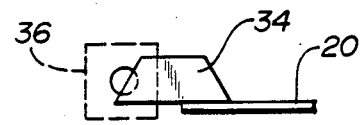

The dancer 20 is shown in partial detail in FIG. 2a. The dancer is formed of an arcuate piece of metal which has a length l that is slightly longer than the width of the paper. The dancer is folded around a shaft 30 along one edge, with the shaft serving to hold the dancer in position in the recorder. At one end of the shaft a spring 32 acts to urge the dancer up against the paper. A small metal fin 34 is mounted on a corner of the dancer remote from the shaft. The fin 34 is nominally positioned in an optical interrupter 36. The optical interrupter contains a light source and a photocell. The light path between these elements is interrupted by the fin 34, as diagrammatically represented in FIG. 2b. When the paper tension relaxes, the dancer 20 moves upward and the fin 34 blocks most or all of the light directed to the photocell. When the paper tension increases, the dancer is pressed downward and the fin 34 allows an increasing amount of light to reach the photocell. Thus the amount of light that impinges upon the photocell is a measure of paper tension.

The control circuitry for the drum motor is shown schematically in FIG. 3. In this FIGURE, the optical interrupter light source is shown as a light emitting diode 35 which directs light toward a photocell 37. The fin 34 is located between the diode 35 and the photocell 37. The photocell is biased to ground by a resistor 42. The output of the photocell is coupled to one input of a summing junction 40. The summing junction is coupled to the positive input of a comparator 50, and a threshold reference voltage, $V_{THR}$, of 4.2 volts is applied to the negative input of the comparator. The output of the comparator is coupled to the "D" input of a data-type flip-flop 52. The $\overline{Q}$ output of the flip-flop 52 is coupled to the "select" input of a switch 54, and to the second input of the summing junction 40 by a resistor 44. The switch 54 receives as inputs two reference frequencies, $f_H$ and $f_L$, from frequency sources 56 and 58. A motor reference signal $F_R$ is produced at the output (common) terminal of the switch 54. This $F_R$ signal is used to clock the flip-flop 52 and is also applied to a servo control system 60 for the motor 64 of the developing drum 24. A slotted wheel (not shown) is mounted on the shaft of the motor 64. As the motor turns, photo interrupters in a sensor 62 sense the passage of the slots in the wheel, thereby producing a signal indicative of the motor speed for the servo system 60. The motor speed signal is compared with the motor reference signal $F_R$ in the servo to develop a speed control signal for the motor 64. The motor 64 is thus controlled by a typical photo interrupter, tachonometric feedback servo system.

In operation, the arrangement of FIG. 3 will switch the $F_R$ motor reference signal applied to servo 60 between a high frequency signal and a low frequency signal, depending upon the sensing of not enough or too much paper tension by the dancer 20. For example, when there is no paper tension the fin 34 will completely block the light path in the interrupter 36, and a "low" signal will be produced at the output of the comparator 50. The flip-flop 52 will be clocked to a "high" state at its $\overline{Q}$ output, which will select the $f_H$ frequency source. The high frequency $f_H$ signal will be applied to the servo 60, which will increase the motor speed and hence the paper tension.

In a similar manner, when there is too much paper tension, the fin 34 will not block the light path in the interrupter and a "high" signal will be produced at the output of the comparator 50 and clocked into flip-flop 52. The resulting "low" signal at the $\overline{Q}$ output will select the low frequency signal $f_L$ for the servo 60, which will decrease the motor speed and the paper tension.

An alternate configuration for implementing the frequency sources 56 and 58 and the switch 54 is shown in FIG. 4. A user-operated paper speed selector is provided on the recorder to allow a user to select one of five different paper speeds: 100 mm/sec., 75 mm/sec., 50 mm/sec., 25 mm/sec., or 10 mm/sec. The paper speed select lines are coupled to a divisor selector 72, where the selected paper speed is used to select a numeric divisor code for a programmable divider 74. The divider 74 receives a 2 MHz input signal and divides this frequency by the applied divisor. For a paper speed of 100 mm/sec., the 2 MHz frequency is divided by three. For the other paper speeds the divisors are 4, 6, 12 and 30, respectively. The divided-down signal, $F_{ps}$, is used as a clock signal for a counter 80, and it may be seen that this $F_{ps}$ clock signal is representative of paper speed.

The counter 80 counts up from a preset starting number to 256, at which count it overflows and produces a pulse at its carry-out output CO. Since the CO output is connected to the "load" input, the CO pulse will immediately reload the counter with the preset number and again count up to 256 from that number.

The preset number is determined by the state of the $\overline{Q}$ output of the flip-flop 52. When the $\overline{Q}$ output is "high", calling for a high frequency signal for servo 60, the preset bit pattern loaded into inputs H-A of counter 80 is 10010111, which is a count of 151. When starting from this number, the counter 80 will reach 256 and produce a CO pulse after 105 clock pulses.

When the $\overline{Q}$ output is "low", calling for a low frequency signal for the servo, the bit pattern loaded into the counter is 01111111, or a count of 127. The counter will therefore count 129 clock pulses before producing a CO pulse.

The difference between the clock pulses that must be counted between CO pulses for the two preset numbers is 129 minus 105, or a 24 count difference. The average of the two is 117 counts. Thus, in order to produce a CO pulse, the required $F_{ps}$ clock pulses are either $(117+12=129)$ or $(117-12=105)$ or a nominal count of $117\pm10\%$. The CO output of the counter 80 thus produces an $F_R$ motor reference signal which is $\pm10\%$ of an average frequency, $F_{AVG}$, regardless of the speed of the paper or the frequency of the $F_{ps}$ signal.

The relationship between the comparator output signal and the $\overline{Q}$ output of flip-flop 52 when paper tension changes from too much tension to too little tension is illustrated in FIG. 5a. This FIGURE also illustrates the operation of the system in an intermediate condition when the paper tension is correct. In a constructed embodiment of the present invention, a motor reference signal frequency for proper paper tension is 70 Hz/mm/sec. This figure is a function of paper speed, as discussed above, where the paper speed is selectable from five possible speeds. The $f_H$ and $f_L$ signals are also a function of paper speed, and are $\pm10\%$ of the desired frequency: $f_H$ is 77 Hz/mm/sec. and $f_L$ is 63 Hz/mm sec. When the paper tension is correct, the comparator and flip-flop will change state every cycle of the motor reference signal, which clocks the flip-flop. The motor 64 with its load, the developing drum 24 and the paper, exhibit a mechanical time constant which is too slow to respond to this cycle-by-cycle change in motor reference frequency. Hence, the effect of this mechanical time constant is to integrate the effect of the frequency variation and the motor will turn at an intermediate, or average speed. The variation of the reference frequency between 77 Hz/mm/sec. and 63 Hz/mm/sec. is an average value, $f_{AVG}$, of 70 Hz/mm/sec., the desired frequency when the paper tension is correct.

This cycle-by-cycle switching of the $F_R$ signal frequency is obtained by feeding back the $\overline{Q}$ flip-flop signal by way of resistor 44 to the comparator input summing junction 40. The value of resistor 44 is chosen to be much larger than the value of resistor 42 so that the relative contribution of the feedback signal is small compared to that of the photocell signal. In the constructed embodiment $(R_{42})/(R_{42}+R_{44})<<1$ This proportioning effectively causes the feedback pulse train to "ride" on the envelope of the photocell voltage, as illustratively shown in FIG. 5b. FIG. 5b is drawn in time correspondence to FIG. 5a, with the high tension condition represented at the left and the low tension condition represented at the right. In the middle of the waveform the pulse train is repetitively alternating above and below the level of the 4.2 volt level of the threshold reference voltage. This is the operating condition which causes the effective average motor reference signal $F_R = f_{AVG}$ to be 70 Hz/mm/sec. for constant desired paper tension.

What is claimed is:

1. In a hard copy recorder in which paper or film is to be moved along a paper path at a predetermined speed, apparatus for controlling the paper or film speed comprising:
   means for conveying said film or paper along said paper path;
   means for sensing the tension of the paper or film in the paper path;
   means, coupled to said sensing means, for producing a signal indicative of paper or film tension;
   a first source of reference signals representative of relatively high paper speed;
   a second source of reference signals representative of relatively low paper speed and available in time simultaneously with the availability of said reference signals produced by said first source; and
   means, responsive to said paper tension signal, for selectively coupling one of said first and second signal sources to said conveying means for controlling the speed at which said paper or film moves along said paper path.

2. In the hard copy recorder of claim 1, wherein said first signal source comprises a source of relatively high frequency signals, and wherein said second signal source comprises a source of relatively low frequency signals.

3. In the hard copy recorder of claim 2, wherein said sensing means comprises a tension-measuring dancer which is in contact with the paper or film in said paper path.

4. In the hard copy recorder of claim 3, wherein said means for producing a signal indicative of paper tension includes a photo interrupter which produces a signal responsive to the position of said dancer.

5. In the hard copy recorder of claim 4, wherein said selectively coupling means comprises a switch having switch contacts coupled to said first and second signal sources and said conveying means, the state of said switch being controlled by said paper tension signal.

6. In the hard copy recorder of claim 4, wherein said dancer includes an opaque fin which modulates a light path of said photo interrupter.

7. In the hard copy recorder of claim 2, wherein said conveying means includes a motor-driven roller, the speed of said motor being controlled by a serve control system, said servo system being responsive to signals produced by one of said first and second signal sources.

8. In the hard copy recorder of claim 7, wherein said selectively coupling means comprises means for alternately coupling said high and low frequency signals to said servo system to maintain a relatively constant paper speed.

9. In the hard copy recorder of claim 1, wherein said first and second signal sources comprise:
  a source of clock signals representative of a nominal paper speed;
  a programmable counter which counts clock signals from said source of clock signals and produces an output whenever a given count is attained, said counter being responsive to a predetermined input count,
  wherein said predetermined input count is determined by said paper tension signal.

10. In the hard copy recorder of claim 9, wherein said selectively coupling means comprises means for coupling said output of said programmable counter to said conveying means.

11. In a hard copy recorder in which film or paper is to be moved along a paper path by a motor-driven roller, apparatus for controlling the speed of paper or film in said paper path comprising:
  a tension measuring dancer which contacts the paper or film in said paper path;
  an optical sensor, responsive to the position of said dancer, and producing an output signal representative of paper or film tension;
  a source of high frequency signals;
  a source of low frequency signals which are produced in time simultaneously with the production of said high frequency signals; and
  switch means, responsive to said optical sensor output signal, for selectively coupling one of said high frequency signals and said low frequency signals to said motor of said motor-driven roller.

* * * * *